US012712767B2

(12) United States Patent
Huang et al.

(10) Patent No.: US 12,712,767 B2
(45) Date of Patent: Aug. 18, 2026

(54) LOW-POWER ANALOG DECISION FEEDBACK EQUALIZER

(71) Applicant: NVIDIA Corporation, Santa Clara, CA (US)

(72) Inventors: Yi-Chieh Huang, Zhubei City (TW); Hao-Wei Hung, New Taipei City (TW); Ying Wei, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 148 days.

(21) Appl. No.: 18/429,713

(22) Filed: Feb. 1, 2024

(65) Prior Publication Data

US 2025/0254071 A1 Aug. 7, 2025

(51) Int. Cl.
*H04L 25/03* (2006.01)

(52) U.S. Cl.
CPC .. *H04L 25/03057* (2013.01); *H04L 25/03267* (2013.01); *H04L 2025/0349* (2013.01)

(58) Field of Classification Search
CPC ......... H04L 25/03006; H04L 25/03019; H04L 25/03057; H04L 25/03267; H04L 2025/0349
USPC ................ 375/232, 233, 316, 346, 348–350; 455/217, 296, 306, 311, 339
See application file for complete search history.

(56) References Cited

U.S. PATENT DOCUMENTS

| | | | | |
|---|---|---|---|---|
| 6,552,615 | B1 * | 4/2003 | Pavan | H03F 3/08 330/110 |
| 2010/0091688 | A1 * | 4/2010 | Staszewski | H04L 27/3863 370/342 |
| 2019/0081600 | A1 * | 3/2019 | Cevrero | H04B 10/6971 |
| 2021/0288590 | A1 * | 9/2021 | Cho | H03K 19/01714 |
| 2022/0255509 | A1 * | 8/2022 | Liu | H03F 1/26 |
| 2023/0130236 | A1 * | 4/2023 | Song | H04B 1/18 455/552.1 |

* cited by examiner

*Primary Examiner* — Young T. Tse
(74) *Attorney, Agent, or Firm* — Lowenstein Sandler LLP

(57) ABSTRACT

A communications circuit includes a receiver (RX) frontend coupled to an RX deserializer and the RX frontend includes a decision feedback equalizer coupled directly between an output and an input of the RX frontend. The decision feedback equalizer may include a first inverter and a series combination of a first resistor and a first capacitor coupled in series with the first inverter.

19 Claims, 4 Drawing Sheets

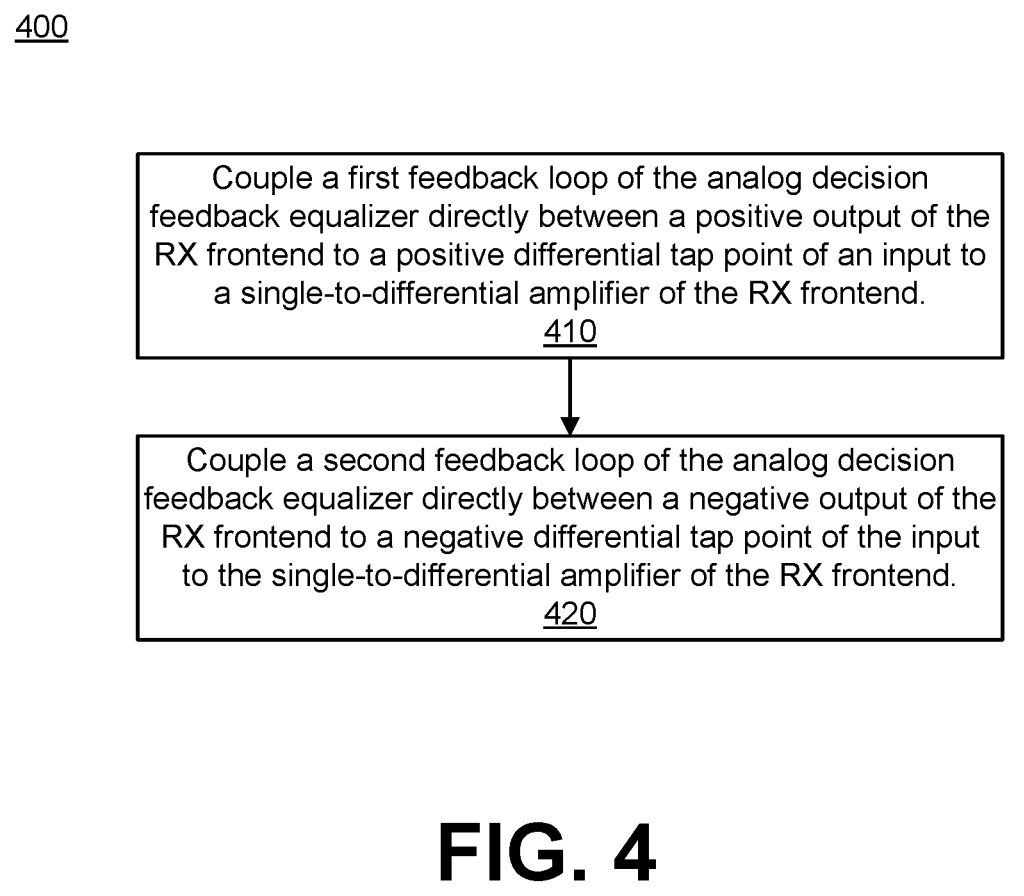

400

Couple a first feedback loop of the analog decision feedback equalizer directly between a positive output of the RX frontend to a positive differential tap point of an input to a single-to-differential amplifier of the RX frontend.
410

Couple a second feedback loop of the analog decision feedback equalizer directly between a negative output of the RX frontend to a negative differential tap point of the input to the single-to-differential amplifier of the RX frontend.
420

FIG. 4

LOW-POWER ANALOG DECISION FEEDBACK EQUALIZER

TECHNICAL FIELD

At least one embodiment pertains to processing resources used to perform equalization over a high-speed serial link. For example, at least one embodiment pertains to technology for low-power analog decision feedback equalizer (DFE).

BACKGROUND

Serial links involve high-speed data communication between serializer-deserializer (SerDes)-based devices, which employ data equalization to enable increasingly higher data rates while being able to correct distortion in multi-path propagation. A serial link uses a SerDes on each end of the link, each with its own Transmitter (TX) and Receiver (RX). By definition, the two SerDes are in different components, e.g., a transmitting serial link device and a receiving serial link device, and hence have differing amounts and types of equalization. While some serial standards specify minimum TX and RX capabilities, components typically provide more equalization than required. Further, lack of standardization has introduced a variety of equalizations implementations, which has caused equalization to become complicated and costly to implement. Not providing sufficient equalization, however, risks errors in data transmission and providing too much equalization can cause noise to threaten data transmission. In some cases, equalization is to be performed with a low supply (VDD) voltage in a frontend (FE) of a link device, which can be challenging given the amount of digital signal processing implemented as part of the equalization.

BRIEF DESCRIPTION OF DRAWINGS

Various embodiments in accordance with the present disclosure will be described with reference to the drawings, in which:

FIG. 4 is a flow diagram of a method for operating a communication circuit having a low-power analog DFE for multi-tap, post-cursor cancellation, in accordance with at least some embodiments.

DETAILED DESCRIPTION

Figure 1:
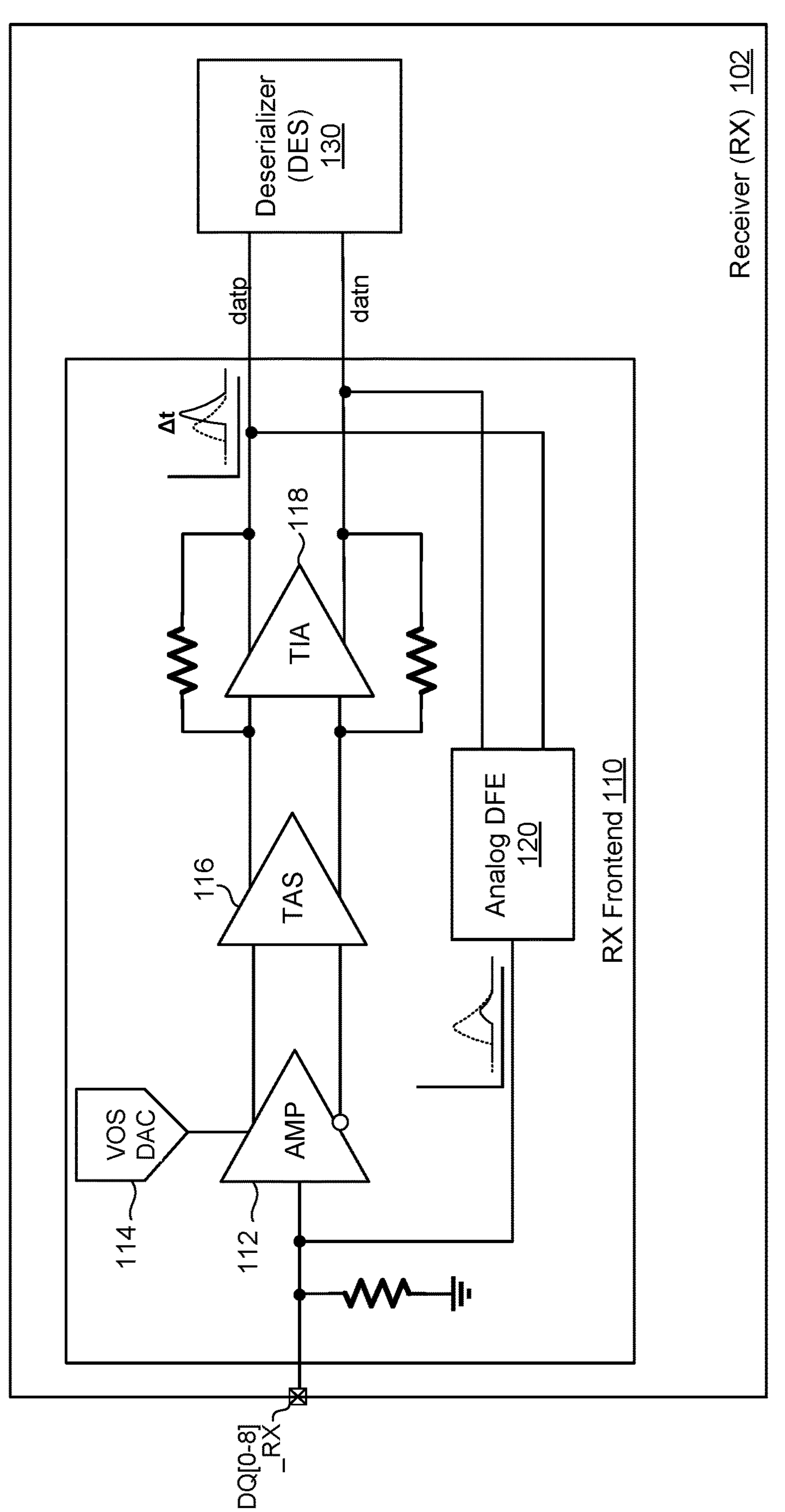
FIG. 1 is a schematic block diagram of a communications device focused on an RX frontend of the communication device, in accordance with at least some embodiments.

Aspects and embodiments of the present disclosure address the above mentioned complexities and other challenges with serial link communication by implementing a low-power analog DFE for multi-tap, post-cursor cancellation. Thus, the focus of this disclosure is on the RX frontend (FE) of a receiver in a serial link (or other similar communication) device. To conserve power with a low-power RX frontend DFE, in various embodiments, the DFE may be implemented as an analog sub-circuit that employs the natural delay of fundamental analog components to forward the output of the RX frontend back to the input of the RX frontend to at least partially cancel a first post-cursor output of the RX frontend. Despite having a lower supply voltage (VDD) of, for example, around 1.0 volts (V) or less, the frontend RX may still be designed to operate at data rates that are higher than 32 gigabits per second (Gbps), e.g., in some embodiments between 32 Gbps and 56 Gbps or more.

In at least some embodiments, a communication circuit (such as a receiver in a serial link device such as a SerDes device) is configured to include an RX fronted coupled to an RX deserializer. In some embodiments, the RX frontend includes a decision feedback equalizer coupled directly between an output and an input of the RX frontend. In at least one embodiment, the decision feedback equalizer includes a first inverter and a series combination of a first resistor and a first capacitor coupled in series with the first inverter. The inverter and resistor-capacitor (RC) design may enable inversion of the feedback signal output from the RX frontend while also forming a bandpass filter when combined with an input resistor at the input of the RX frontend.

When the RX frontend includes a serial-to-differential signal amplifier, the RX frontend may output both a positive output and a negative output. In such embodiments, the first inverter and the series combination of the first resistor and the first capacitor are coupled between the positive output and a positive differential tap point of an input to the serial-to-differential signal amplifier of the RX frontend. The DFE may further include a second inverter coupled to a negative output of the RX frontend and a second series combination of a second resistor and a second capacitor coupled in series with the second inverter and to a negative differential tap point of the input. In this way, the low-power analog DFE is adapted for inclusion in a differential-based RX frontend design.

Therefore, advantages of the systems and methods implemented in accordance with some embodiments of the present disclosure include, but are not limited to, a low-power-designed DFE in the RX frontend of communication devices that conserves power, minimizes inter-symbol interference (IS), and yet operates at high data rates, as will be discussed herein. The disclosed low-power analog DFE may thus advantageously operate at low noise levels and feed noise-sensitive sense amplifiers of the deserializer in receiver designs of increasingly higher bandwidth and frequencies. Other advantages will be apparent to those skilled in the art of serial data link communication discussed hereinafter.

FIG. 1 is a schematic block diagram of a communications device 100 focused on an RX frontend 110 of a receiver (RX) of the communication device 100, in accordance with at least some embodiments. More specifically, the communication device 100 includes a receiver (RX) 102 that includes the RX frontend 110 coupled to a deserializer 130, the latter of which includes sense amplifiers to sense data levels in the serialized data and convert the serialized data into deserialized data. Although beyond the scope of this disclosure, it should be understood that the RX 102 may further include an RX phase-locked loop (PLL) coupled to the deserializer 130.

In at least some embodiments, the RX frontend 110 includes an amplifier 112, an oscillating voltage (VOS) digital-to-analog converter (DAC), or VOS DAC 114, a transadmittance stage or TAS 116 coupled to the amplifier 112, a trans-impedance amplifier or TIA 118 coupled to the TAS 116, where the TIA 118 is to output a differential signal of serialized data to the deserializer 130. In some embodiments, as referred to hereinbelow, the amplifier 112, the TAS 116, and the TIA 118 may constitute what is referred to as a "main pass" through the RX frontend, providing some level of equalization, offset calibration, and filtering to the signal detected at the input, e.g., by a sensor used to detect changes in light via a photodiode or other type of optical receiver input. Although optical means for data transmission are common and referred to herein, others are envisioned that are capable of providing disclosed data rates and bandwidth. For example, a data rate supported by the RX frontend 110 may include a range of between 32 gigabits per second (Gbps) and 56 Gbps.

In various embodiments, the RX frontend 110 may further include an analog DFE 120 coupled directly between an output and an input of the RX frontend 110. In particular, the output of the analog DFE 120 may be input back into the input of the amplifier 112. Because the input to the analog DFE 120 may differential, the output of the analog DFE 120 may also be differential, which will be illustrated and discussed with reference to FIG. 2. In some embodiments, the VOS DAC 114 generates a particular voltage at which to power the amplifier 112. The amplifier 112 may be a serial-to-differential amplifier having positive and negative outputs that tend to reject common-mode noise and improving the performance of the RX frontend 110.

In at least some embodiments, the TAS 116 receives the positive and negative outputs from the amplifier 112 and outputs a voltage signal. More specifically, the TAS 116 may act as a voltage-to-current converter, which converts an input current-voltage signal into an output current signal. This conversion can help in maintaining signal integrity, especially when dealing with weak or high-frequency signals.

In various embodiments, the TIA 118 is designed to handle very low levels of input current with high sensitivity such as may be used in optical receivers and photodiode circuits. In the RX frontend 110, being coupled to the output of the TAS 116, the TIA 118 may thus help amplify the minute currents generated by photodetectors (not illustrated in the RX 102) into measurable voltages without adding significant noise or distortion. Thus, the TIA 118 may be employed in fiber-optic communication systems in some embodiments. In disclosed embodiments, a combination of the TAS 116 and the TIA 118, with the illustrated feedback resistors across the TIA 118, form a high bandwidth and a high gain amplifier and also perform some equalization within the main pass through the RX frontend 110. In some embodiments, the amplifier 112, the TAS 116, and the TIA 118 amplify the detected input signal enough to reach sufficient swing for generating a differential output that can be sensed by sense amplifiers (SAs) of the deserializer 130.

As illustrated, each of the positive data line (datp) and the negative data line (datn) output from the TIA 118 is fed back to a corresponding input to the TIA 118 via a resistor, and each of the positive output and the negative output is provided to the deserializer 130 and also provided to the analog DFE 120. As can be seen in the inset graph at the output of the TIA 118, a single data pulse, after processing through the main pass of the RX frontend 110, spreads out significantly over multiple unit intervals (UIs) due to the bandwidth-limited channel nature of the main pass of the RX frontend 110. The analog DFE 120 may configured in a way that employs the natural delay of passive analog components to provide a delayed version of the output back to the input of the amplifier 112, which then at least partially cancels out (or smooths out) the first post-cursor output of the amplifier 112. The first post-cursor may be a first a several multi-tap post cursors.

Figure 2:
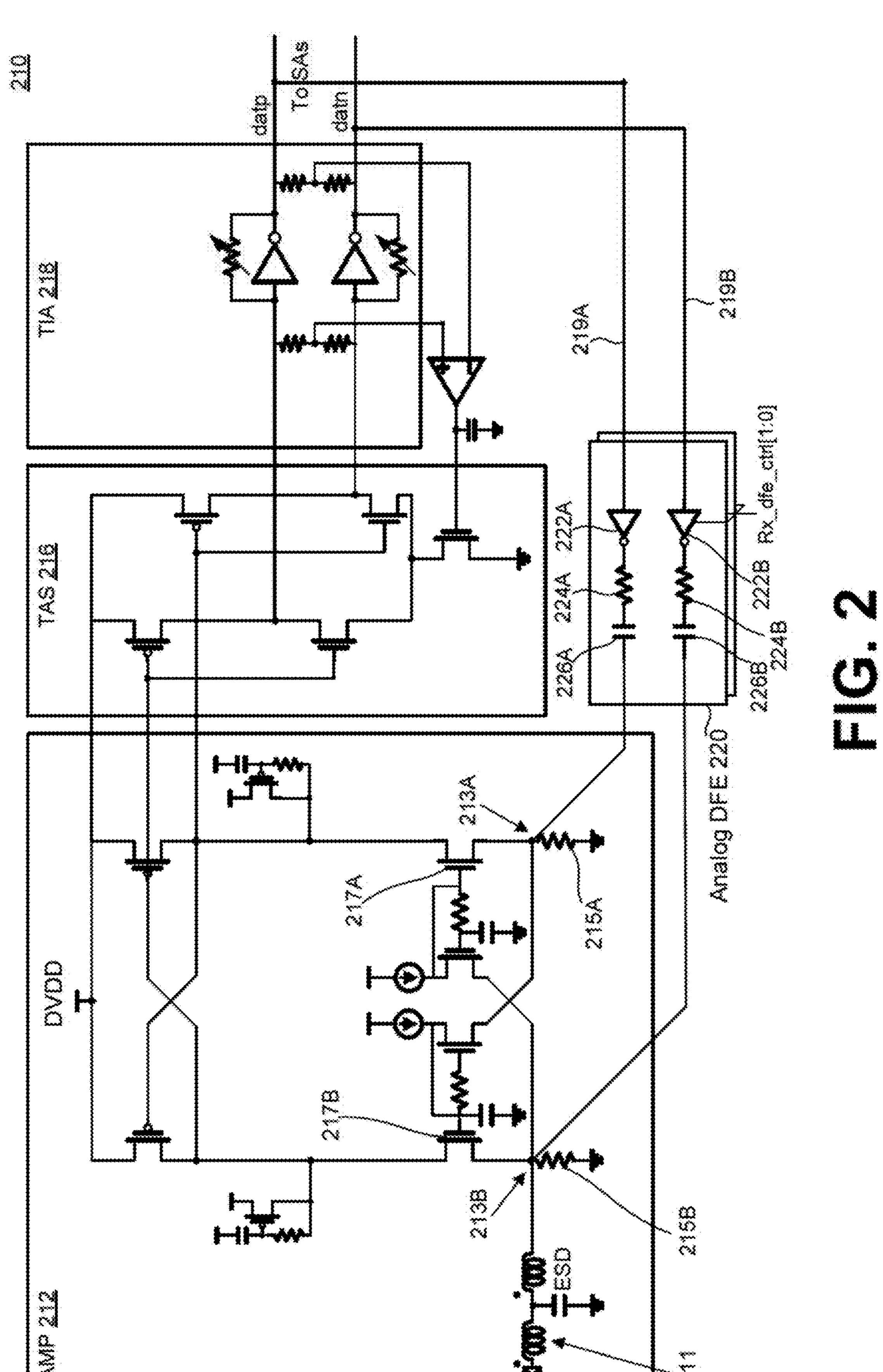
FIG. 2 is a schematic circuit layout illustrating additional detail of an RX frontend, in accordance with at least some embodiments.

FIG. 2 is a schematic circuit layout illustrating additional detail of an RX frontend 210, in accordance with at least some embodiments. In at least one embodiment, the RX frontend 210 includes a single-to-differential signal amplifier 212, a trans-admittance stage (TAS) 216 coupled to the single-to-differential signal amplifier 212, a trans-impedance amplifier (TIA) 218 coupled to the TAS 216, and an analog DFE 220 coupled directly between an output of the TIA 218 and an input to the single-to-differential signal amplifier 212. In some embodiments, the amplifier 212 includes a positive differential tap point 213A and a negative differential tap point 213B. In some embodiments, the RX frontend 110 of FIG. 1 is the RX frontend 210 illustrated in FIG. 2. For example, in some embodiments, the amplifier 112, the TAS 116, the TIA 118, and the analog DFE 120 of FIG. 1 are the amplifier 212, the TAS 216, the TIA 218, and the analog DFE 220 of FIG. 2. In some embodiments, the input of the amplifier 212 (and thus of the RX frontend 210 after any optical detector(s)) includes a transformer 211 having a pair of coils with a capacitor coupled therebetween, e.g., to provide electrostatic discharge (ESD) protection.

In at least some embodiments, the RX frontend 210 is powered by a low supply voltage, e.g., a digital VDD (DVDD) or regulated VDD (RVDD) that is lower than 1.0 volt (V), e.g., between 0.5 and 1.0 volts. For example, in at least one embodiment, the DVDD is around 0.9 V (e.g., 0.86 V), and RVDD is around 0.7 V (e.g., 0.676 V, 0.720 V, or 0.764 V). In some embodiments, with the low noise sensitivity from the illustrated design, the RX frontend 110 operates higher than 32 Gbps, e.g., between 32 Gbps and 56 Gbps, or at least between 36-45 Gbps in other embodiments.

In some embodiments, the analog DFE 220 includes a first inverter 222A coupled to a positive output 219A (or positive output line) of the TIA 218 and a series combination of a first resistor 224A and a first capacitor 226A coupled in series with the first inverter 222A and to the positive differential tap point 213A of the input to the amplifier 212. In some embodiments, the series combination of the first resistor 224A and the first capacitor 226A combined with an input resistor 215A of the RX frontend operate as a bandpass filter configured to coincide with a first post cursor output by the RX frontend.

More specifically, the first inverter 222A may act as a limiting amplifier and the serial combination of the first resistor 224A and the first capacitor 226A (first RC) may act as a bandpass filter. For the bandpass filter, parasitic capacitance and the added serial resistance may form a low-pass filter, and the added serial capacitance and the input resistor 215A may form a high-pass filter. In some embodiments, capacitance of the first capacitor 226A and resistance of the first resistor 224A are selected based on a feedback delay and channel characteristics of the RX frontend 210. In some design implementations, the first capacitor 226A is in a range of between five and 15 femtofarads and the first resistor 224A is in a range between 500 ohms and 1.5 kilo-ohms.

In some embodiments, the analog DFE 220 includes a second inverter 222B coupled to a negative output 219B (or negative output line) of the TIA 218 and a series combination of a second resistor 224B and a second capacitor 226B coupled in series with the second inverter 222B and to the negative differential tap point 213B of the input to the amplifier 212. In some embodiments, the series combination of the first resistor 224A and the first capacitor 226A combined with an input resistor 215B of the RX frontend operate as the bandpass filter configured to coincide with the first post cursor output by the RX frontend.

More specifically, the second inverter 222B may act as a limiting amplifier and the serial combination of the second resistor 224B and the second capacitor 226B (first RC) may act as a bandpass filter. For the bandpass filter, parasitic capacitance and the added serial resistance may form a low-pass filter, and the added serial capacitance and the input resistor 215B may form a high-pass filter. In some embodiments, the second capacitor 226B is in a range of between five and 15 femtofarads and the second resistor 224B is in a range between 500 ohms and 1.5 kilo-ohms.

In various embodiments, a resistance of the first and second resistors 224A and 224B approximately match, e.g., within device tolerances, and a capacitance of the first and second capacitors 226A and 226B approximately match, e.g., within device tolerances. These device tolerances may be set in manufacturing, as some semiconductor-based deviations of capacitance and resistance are expected. In some embodiments, the positive differential tap point 213A is located in a first source of a first n-type metal-oxide semiconductor (NMOS) transistor 217A, which is positioned in a positive side of the single-to-differential signal amplifier 212. In some embodiments, the negative differential tap point 213B is located in a second source of a second NMOS transistor 217B, which is positioned in a negative side of the single-to-differential signal amplifier 212. In some embodiments, the first NMOS transistor 217A and the second NMOS transistor 217B of the amplifier 212 are cross-coupled with another pair of NMOS transistors as current mirrors, which are biased with current sources. A portion of the amplifier 212 is illustrated by way of example, but other semiconductor-designed amplifiers, particularly a single-to-differential design, are envisioned.

In some embodiments, the analog DFE 120 and 220 are able to provide feedback equalization without sampling the positive output 219A or the negative output 219B of the TIA 218; thus the RX frontend 110 and 210 may not require a clock. The ability to deploy a clockless DFE in the analog DFE 120 or 220 designs saves on circuit design and area in eliminating a clock-distribution tree.

Figure 3:
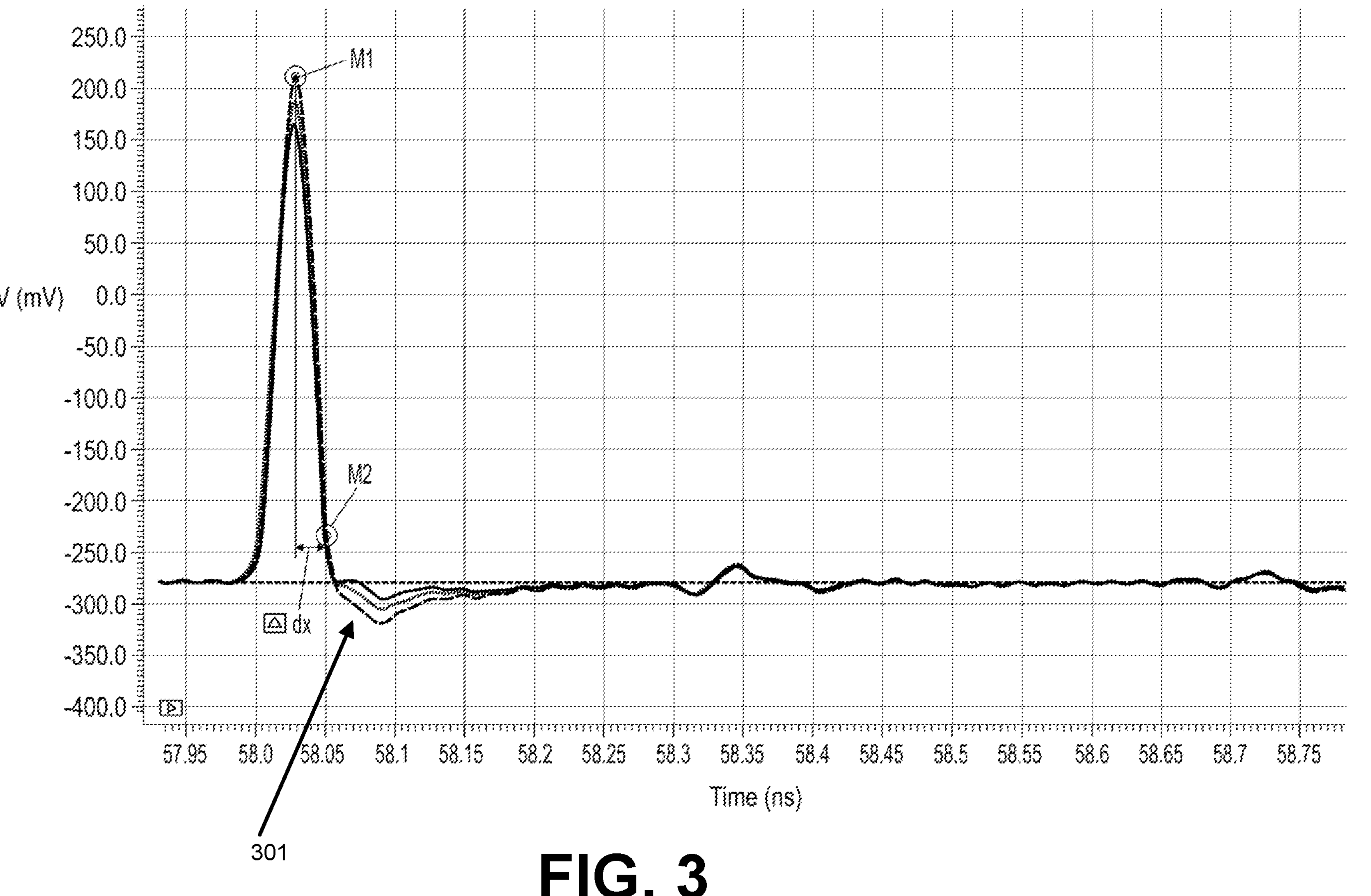
FIG. 3 is a graph illustrating a single bit response in which the disclosed low-power analog decision feedback equalizer (DFE) at least partially cancels a first post-cursor output, in accordance with at least some embodiments.

FIG. 3 is a graph illustrating a single bit response in which the disclosed low-power analog decision feedback equalizer (DFE) 120 or 220 at least partially cancels a first post-cursor output 301 (e.g., h1), in accordance with at least some embodiments. Due to channel and equalizer characteristics, other post cursors (e.g., h2, h3, h4 . . . ) might be overcompensated as h1 is well-compensated in typical DFEs. The disclosed analog DFE 120 or 220, however, may alleviate the overcompensated issue by using the nature of the RC delay through the resistors and capacitors of the analog design, which was discussed with reference to FIG. 2.

As illustrated in FIG. 3, the output of the RX frontend 110 or 210 fed back to the amplifier 112 or 212 partially cancels a first post-cursor output 301 (or "h1") more or less depending on the design of the amplifier 112 or 212 and that of the analog DFE 120 or 220. The clockless design of the analog DFE 120 and 220 may further enable minimizing jitter (e.g., broadly inter-symbol interference) without overcompensating for other post cursors. For example, feeding back the main output pulse with less delay (due to analog DFE design) allows better cancellation (due to inversion of the main output pulse) of a long tail without overcompensation.

FIG. 4 is a flow diagram of a method 400 for operating a communication circuit having a low-power analog DFE for multi-tap, post-cursor cancellation, in accordance with at least some embodiments. In some embodiments, the method is implemented by the RX 102 of FIG. 1, and particularly by the RX frontend 110 of the RX 102 (illustrated in FIG. 1) or by the RX frontend 210 (illustrated in FIG. 2).

At operation 410, the RX frontend 110 or 210 couples a first feedback loop of the analog decision feedback equalizer directly between a positive output of the RX frontend to a positive differential tap point of an input to a single-to-differential amplifier of the RX frontend.

At operation 420, the RX frontend 110 or 210 couples a second feedback loop of the analog decision feedback equalizer directly between a negative output of the RX frontend to a negative differential tap point of the input to the single-to-differential amplifier of the RX frontend.

In embodiments of the method 400, the first feedback loop includes a first inverter and a series combination of a first resistor and a first capacitor coupled in series with the first inverter. In such embodiments, the method 400 further includes the analog decision feedback equalizer not sampling the positive output of the RX frontend.

In embodiments of the method 400, second feedback loop includes a second inverter and a series combination of a second resistor and a second capacitor coupled in series with the second inverter. In such embodiments, the method 400 further includes the analog decision feedback equalizer not sampling the negative output of the RX frontend.

In embodiments of the method 400, designing the series combination of the second resistor and the second capacitor combined with an input resistor of the RX frontend as a bandpass filter is configured to coincide with a first post cursor output by the RX frontend.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C,"

unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, a "processor" may be a network device or a MACsec device. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A communications circuit comprising:

a receiver (RX) frontend coupled to an RX deserializer; wherein the RX frontend comprises a decision feedback equalizer coupled directly between an output and an input of the RX frontend, the decision feedback equalizer comprising:

a first inverter; and a series combination of a first resistor and a first capacitor coupled in series with the first inverter, wherein the series combination of the first resistor and the first capacitor combined with an input resistor of the RX frontend operates as a bandpass filter configured to coincide with a first post cursor output by the RX frontend.

2. The communications circuit of claim 1, wherein a capacitance of the first capacitor and a resistance of the first resistor are selected based on a feedback delay and channel characteristics of the RX frontend.

3. The communications circuit of claim 1, wherein a data rate supported by the RX frontend is higher than 32 gigabits per second.

4. The communications circuit of claim 1, wherein the RX frontend and the RX deserializer are configured to operate at a supply voltage that is lower than 1.0 volt.

5. The communications circuit of claim 1, wherein:

the first inverter is coupled to a positive output of the RX frontend;

the series combination of the first resistor and first capacitor is coupled to a positive differential tap point of the input of the RX frontend; and the decision feedback equalizer further comprises:

a second inverter coupled to a negative output of the RX frontend; and a second series combination of a second resistor and a second capacitor coupled in series with the second inverter and to a negative differential tap point of the input of the RX frontend.

6. The communications circuit of claim 5, wherein a resistance of the first and second resistors is matched within first device tolerances, and a capacitance of the first and second capacitors is approximately matched within second device tolerances.

7. The communications circuit of claim 5, wherein the RX frontend further comprises a single-to-differential signal amplifier comprising both the positive differential tap point and the negative differential tap point.

8. A communications device comprising:

a receiver (RX) frontend coupled to an RX deserializer, wherein the RX frontend comprises:

a single-to-differential signal amplifier;

a trans-admittance stage (TAS) coupled to the single-to-differential signal amplifier;

a trans-impedance amplifier (TIA) coupled to the TAS; and a decision feedback equalizer coupled directly between an output of the TIA and an input to the single-to-differential signal amplifier, wherein the decision feedback equalizer comprises:

a first inverter coupled to a positive output of the TIA; and a series combination of a first resistor and a first capacitor coupled in series with the first inverter and to a positive differential tap point of the input to the single-to-differential signal amplifier.

9. The communications device of claim 8, wherein the series combination of the first resistor and the first capacitor is combined with an input resistor of the single-to-differential signal amplifier and operates as a bandpass filter configured to coincide with a first post cursor output by the TIA.

10. The communications device of claim 9, wherein a capacitance of the first capacitor and a resistance of the first resistor are selected based on a feedback delay and channel characteristics of the RX frontend.

11. The communications device of claim 8, wherein a data rate supported by the RX frontend is higher than 32 gigabits per second.

12. The communications device of claim 8, wherein the RX frontend and the RX deserializer are configured to operate at a supply voltage that is lower than 1.0 volt.

13. The communications device of claim 8, wherein the decision feedback equalizer further comprises:

a second inverter coupled to a negative output of the TIA; and a series combination of a second resistor and a second capacitor coupled in series with the second inverter and to a negative differential tap point of the input to the single-to-differential signal amplifier.

14. The communications device of claim 13, wherein a resistance of the first and second resistors is matched within first device tolerances, and a capacitance of the first and second capacitors is approximately matched within second device tolerances.

15. The communications device of claim 13, wherein:

the positive differential tap point is located in a first source of a first n-type metal-oxide semiconductor (NMOS) transistor, which is positioned in a positive side of the single-to-differential signal amplifier; and the negative differential tap point is located in a second source of a second NMOS transistor, which is positioned in a negative side of the single-to-differential signal amplifier.

16. A method of operating a communications circuit comprising a receiver (RX) frontend including an analog decision feedback equalizer coupled to an RX deserializer, wherein the method comprises:

coupling a first feedback loop of the analog decision feedback equalizer directly between a positive output of the RX frontend to a positive differential tap point of an input to a single-to-differential amplifier of the RX frontend; and coupling a second feedback loop of the analog decision feedback equalizer directly between a negative output of the RX frontend to a negative differential tap point of the input to the single-to-differential amplifier of the RX frontend.

17. The method of claim 16, wherein the first feedback loop comprises a first inverter and a series combination of a first resistor and a first capacitor coupled in series with the first inverter, and wherein the analog decision feedback equalizer does not sample the positive output of the RX frontend.

18. The method of claim 16, wherein the second feedback loop comprises a second inverter and a series combination of a second resistor and a second capacitor coupled in series with the second inverter, and wherein the analog decision feedback equalizer does not sample the negative output of the RX frontend.

19. The method of claim 18, further comprising designing the series combination of the second resistor and the second capacitor combined with an input resistor of the single-to-differential amplifier of the RX frontend as a bandpass filter configured to coincide with a first post cursor output by the RX frontend.

* * * * *